(12) United States Patent
Forbes, Jr. et al.

(10) Patent No.: US 8,260,470 B2
(45) Date of Patent: Sep. 4, 2012

(54) SYSTEM AND METHOD FOR SELECTIVE DISCONNECTION OF ELECTRICAL SERVICE TO END CUSTOMERS

(75) Inventors: Joseph W. Forbes, Jr., Wake Forest, NC (US); Joel L. Webb, Raleigh, NC (US); Roy Moore, Boca Raton, FL (US); David Shaw, Wake Forest, NC (US)

(73) Assignee: Consert, Inc., Raleigh, NC (US)

( * ) Notice: Subject to any disclaimer, the term of this patent is extended or adjusted under 35 U.S.C. 154(b) by 269 days.

(21) Appl. No.: 12/702,768

(22) Filed: Feb. 9, 2010

(65) Prior Publication Data

US 2010/0145544 A1 Jun. 10, 2010

Related U.S. Application Data (63) Continuation-in-part of application No. 11/895,909, filed on Aug. 28, 2007, now Pat. No. 7,715,951.

(60) Provisional application No. 61/177,044, filed on May 11, 2009, provisional application No. 61/150,978, filed on Feb. 9, 2009.

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G08B 23/00* (2006.01)
*G08C 15/06* (2006.01)

(52) U.S. Cl. ........ 700/295; 700/291; 700/292; 700/296; 700/297; 340/870.02

(58) Field of Classification Search .................. 700/286, 700/291–298; 340/870.02
See application file for complete search history.

(56) References Cited

U.S. PATENT DOCUMENTS

| 3,906,242 A | 9/1975 | Stevenson |
| 4,023,043 A | 5/1977 | Stevenson |
| 4,589,075 A | 5/1986 | Buennagel |

(Continued)

FOREIGN PATENT DOCUMENTS

EP 1729223 12/2006

(Continued)

OTHER PUBLICATIONS

Inoue, et al. Network Architecture for Home Energy Management System, IEEE Transactions on Consumer Electronics, vol. 49, Issue 3, Aug. 2003, pp. 606-613 (8 pages).

(Continued)

*Primary Examiner* — Ramesh Patel
(74) *Attorney, Agent, or Firm* — Womble Carlyle Sandridge & Rice, LLP (57) ABSTRACT

A system and method for selective disconnection of electrical service to a customer via commands transmitted on a communications network between a server in communication with an electric utility and a client device at a customer service point. A customer profile is generated including at least connection information for a plurality of controllable devices within the service point. A request is received from the electric utility to generate a selective disconnect event at the service point based on the customer profile. The selective disconnect event is communicated to the client device at the service point. The selective disconnect event is sent to at least one controllable device at the service point.

30 Claims, 4 Drawing Sheets

U.S. PATENT DOCUMENTS

| | | | |
|---|---|---|---|
| 4,799,059 A | 1/1989 | Grindahl et al. | |
| 5,237,507 A | 8/1993 | Chasek | |
| 5,361,982 A | 11/1994 | Liebl et al. | |
| 5,388,101 A | 2/1995 | Dinkins | |
| 5,481,546 A | 1/1996 | Dinkins | |
| 5,495,239 A | 2/1996 | Ouellette | |
| 5,544,036 A | 8/1996 | Brown et al. | |
| 5,553,094 A | 9/1996 | Johnson et al. | |
| 5,570,002 A | 10/1996 | Castleman | |
| 5,592,491 A | 1/1997 | Dinkins | |
| 5,640,153 A | 6/1997 | Hildebrand et al. | |
| 5,644,173 A | 7/1997 | Elliason et al. | |
| 5,675,503 A | 10/1997 | Moe et al. | |
| 5,682,422 A | 10/1997 | Oliver | |
| 5,696,695 A | 12/1997 | Ehlers et al. | |
| 5,748,104 A | 5/1998 | Argyroudis et al. | |
| 5,926,776 A | 7/1999 | Glorioso et al. | |
| 6,018,690 A | 1/2000 | Saito et al. | |
| 6,047,274 A | 4/2000 | Johnson et al. | |
| 6,078,785 A | 6/2000 | Bush | |
| 6,122,603 A | 9/2000 | Budike, Jr. | |
| 6,178,362 B1 | 1/2001 | Woolard et al. | |
| 6,185,483 B1 | 2/2001 | Drees | |
| 6,233,327 B1 | 5/2001 | Petite | |
| 6,254,009 B1 | 7/2001 | Proffitt et al. | |
| 6,374,101 B1 | 4/2002 | Gelbien | |
| 6,437,692 B1 | 8/2002 | Petite et al. | |
| 6,519,509 B1 | 2/2003 | Nierlich et al. | |
| 6,535,797 B1* | 3/2003 | Bowles et al. | 700/291 |
| 6,601,033 B1 | 7/2003 | Sowinski | |
| 6,622,097 B2* | 9/2003 | Hunter | 702/61 |
| 6,622,925 B2 | 9/2003 | Carner et al. | |
| 6,633,823 B2* | 10/2003 | Bartone et al. | 702/57 |
| 6,671,586 B2 | 12/2003 | Davis et al. | |
| 6,681,154 B2 | 1/2004 | Nierlich et al. | |
| 6,687,574 B2 | 2/2004 | Pietrowicz et al. | |
| 6,732,055 B2 | 5/2004 | Bagepalli et al. | |
| 6,778,882 B2 | 8/2004 | Spool et al. | |
| 6,784,807 B2 | 8/2004 | Petite et al. | |
| 6,785,592 B1 | 8/2004 | Smith et al. | |
| 6,832,135 B2* | 12/2004 | Ying | 700/295 |
| 6,836,737 B2 | 12/2004 | Petite et al. | |
| 6,862,498 B2 | 3/2005 | Davis et al. | |
| 6,865,450 B2 | 3/2005 | Masticola et al. | |
| 6,882,498 B2* | 4/2005 | Kurumatani et al. | 360/83 |
| 6,891,838 B1 | 5/2005 | Petite et al. | |
| 6,904,336 B2 | 6/2005 | Raines et al. | |
| 6,906,617 B1 | 6/2005 | Van der Meulen | |
| 6,909,942 B2 | 6/2005 | Andarawis et al. | |
| 6,914,533 B2 | 7/2005 | Petite | |
| 6,914,893 B2 | 7/2005 | Petite | |
| 6,934,316 B2 | 8/2005 | Cornwall et al. | |
| 7,019,667 B2 | 3/2006 | Petite et al. | |
| 7,035,719 B2 | 4/2006 | Howard et al. | |
| 7,039,532 B2 | 5/2006 | Hunter | |
| 7,053,767 B2 | 5/2006 | Petite et al. | |
| 7,088,014 B2 | 8/2006 | Nierlich et al. | |
| 7,103,511 B2 | 9/2006 | Petite | |
| 7,123,994 B2 | 10/2006 | Weik et al. | |
| 7,130,719 B2 | 10/2006 | Ehlers et al. | |
| 7,133,750 B2 | 11/2006 | Raines et al. | |
| 7,177,728 B2 | 2/2007 | Gardner | |
| 7,181,320 B2 | 2/2007 | Whiffen et al. | |
| 7,184,861 B2 | 2/2007 | Petite | |
| 7,200,134 B2 | 4/2007 | Proctor, Jr. et al. | |
| 7,206,670 B2 | 4/2007 | Pimputkar et al. | |
| 7,209,804 B2 | 4/2007 | Curt et al. | |
| 7,209,840 B2 | 4/2007 | Petite et al. | |
| 7,233,843 B2 | 6/2007 | Budhraja et al. | |
| 7,263,073 B2 | 8/2007 | Petite et al. | |
| 7,274,975 B2 | 9/2007 | Miller | |
| 7,289,887 B2* | 10/2007 | Rodgers | 700/295 |
| 7,295,128 B2 | 11/2007 | Petite | |
| 7,305,282 B2 | 12/2007 | Chen | |
| 7,313,465 B1 | 12/2007 | O'Donnell | |
| 7,343,341 B2 | 3/2008 | Sandor et al. | |
| 7,345,998 B2 | 3/2008 | Cregg et al. | |
| 7,346,463 B2 | 3/2008 | Petite et al. | |
| 7,397,907 B2 | 7/2008 | Petite | |
| 7,406,364 B2 | 7/2008 | Andren et al. | |
| 7,412,304 B2 | 8/2008 | Uenou | |
| 7,424,527 B2 | 9/2008 | Petite | |
| 7,440,871 B2 | 10/2008 | McConnell et al. | |
| 7,451,019 B2 | 11/2008 | Rodgers | |
| 7,468,661 B2 | 12/2008 | Petite et al. | |
| 7,480,501 B2 | 1/2009 | Petite | |
| 7,536,240 B2 | 5/2009 | McIntyre et al. | |
| 7,541,941 B2 | 6/2009 | Bogolea et al. | |
| 7,565,227 B2 | 7/2009 | Richard et al. | |
| 7,650,425 B2 | 1/2010 | Davis et al. | |
| 7,697,492 B2 | 4/2010 | Petite | |
| 7,711,796 B2 | 5/2010 | Gutt et al. | |
| 7,715,951 B2 | 5/2010 | Forbes, Jr. et al. | |
| 7,738,999 B2 | 6/2010 | Petite | |
| 7,739,378 B2 | 6/2010 | Petite | |
| 2001/0038343 A1 | 11/2001 | Meyer et al. | |
| 2002/0019802 A1 | 2/2002 | Malme et al. | |
| 2002/0035496 A1 | 3/2002 | Fujushima et al. | |
| 2002/0109607 A1 | 8/2002 | Cumeralto et al. | |
| 2002/0138176 A1 | 9/2002 | Davis et al. | |
| 2002/0143693 A1 | 10/2002 | Soestbergen et al. | |
| 2003/0036820 A1 | 2/2003 | Yellepeddy et al. | |
| 2003/0083980 A1 | 5/2003 | Satake | |
| 2003/0144864 A1 | 7/2003 | Mazzarella | |
| 2003/0229572 A1 | 12/2003 | Raines et al. | |
| 2004/0006439 A1 | 1/2004 | Hunter | |
| 2004/0088083 A1 | 5/2004 | Davis et al. | |
| 2004/0095237 A1* | 5/2004 | Chen et al. | 340/506 |
| 2004/0128266 A1 | 7/2004 | Yellepeddy et al. | |
| 2004/0158478 A1 | 8/2004 | Zimmerman | |
| 2004/0162793 A1 | 8/2004 | Scott et al. | |
| 2004/0193329 A1* | 9/2004 | Ransom et al. | 700/286 |
| 2005/0033481 A1 | 2/2005 | Budhraja et al. | |
| 2005/0055432 A1 | 3/2005 | Rodgers | |
| 2005/0065742 A1 | 3/2005 | Rodgers | |
| 2005/0096856 A1 | 5/2005 | Lubkeman et al. | |
| 2005/0096857 A1 | 5/2005 | Hunter | |
| 2005/0116836 A1 | 6/2005 | Perry et al. | |
| 2005/0125243 A1 | 6/2005 | Villalobos | |
| 2005/0138432 A1* | 6/2005 | Ransom et al. | 713/201 |
| 2005/0192711 A1 | 9/2005 | Raines et al. | |
| 2005/0216302 A1 | 9/2005 | Raji et al. | |
| 2005/0216580 A1 | 9/2005 | Raji et al. | |
| 2005/0240314 A1 | 10/2005 | Martinez | |
| 2005/0240315 A1 | 10/2005 | Booth et al. | |
| 2005/0246190 A1 | 11/2005 | Sandor et al. | |
| 2005/0267642 A1 | 12/2005 | Whiffen et al. | |
| 2006/0020544 A1 | 1/2006 | Kaveski | |
| 2006/0022841 A1 | 2/2006 | Hoiness et al. | |
| 2006/0025891 A1 | 2/2006 | Budike | |
| 2006/0031934 A1 | 2/2006 | Kriegel | |
| 2006/0064205 A1 | 3/2006 | Ying | |
| 2006/0106635 A1 | 5/2006 | Ulrich et al. | |
| 2006/0142900 A1 | 6/2006 | Rothman et al. | |
| 2006/0161450 A1 | 7/2006 | Carey et al. | |
| 2006/0168191 A1 | 7/2006 | Ives | |
| 2006/0195334 A1 | 8/2006 | Reeb et al. | |
| 2006/0259199 A1* | 11/2006 | Gjerde et al. | 700/284 |
| 2006/0271244 A1 | 11/2006 | Cumming et al. | |
| 2006/0271314 A1 | 11/2006 | Hayes | |
| 2007/0058629 A1 | 3/2007 | Luft | |
| 2007/0085702 A1 | 4/2007 | Walters et al. | |
| 2007/0100503 A1 | 5/2007 | Balan et al. | |
| 2007/0203722 A1 | 8/2007 | Richards et al. | |
| 2007/0204176 A1 | 8/2007 | Shaffer et al. | |
| 2007/0205915 A1* | 9/2007 | Shuey et al. | 340/870.02 |
| 2007/0213878 A1 | 9/2007 | Chen | |
| 2007/0255457 A1 | 11/2007 | Whitcomb et al. | |
| 2007/0286210 A1 | 12/2007 | Gutt et al. | |
| 2007/0299562 A1 | 12/2007 | Kates | |
| 2008/0015976 A1 | 1/2008 | Sandor et al. | |
| 2008/0091625 A1 | 4/2008 | Kremen | |
| 2008/0130673 A1 | 6/2008 | Cregg et al. | |
| 2008/0147465 A1 | 6/2008 | Raines et al. | |
| 2008/0172312 A1 | 7/2008 | Synesiou et al. | |
| 2008/0177678 A1 | 7/2008 | Di Martini | |
| 2008/0224892 A1 | 9/2008 | Bogolea et al. | |

| | | | |
|---|---|---|---|
| 2008/0238710 | A1 | 10/2008 | Tolnar et al. |
| 2008/0255899 | A1 | 10/2008 | McConnell et al. |
| 2008/0281473 | A1 | 11/2008 | Pitt |
| 2009/0018884 | A1 | 1/2009 | McConnell et al. |
| 2009/0043519 | A1 | 2/2009 | Bridges et al. |
| 2009/0043520 | A1 | 2/2009 | Pollack et al. |
| 2009/0055031 | A1 | 2/2009 | Slota et al. |
| 2009/0062970 | A1 | 3/2009 | Forbes, Jr. |
| 2009/0063228 | A1 | 3/2009 | Forbes, Jr. |
| 2009/0106571 | A1* | 4/2009 | Low et al. .................. 713/310 |
| 2009/0112758 | A1 | 4/2009 | Herzig |
| 2009/0135836 | A1 | 5/2009 | Veillette |
| 2009/0187499 | A1* | 7/2009 | Mulder et al. ................ 705/30 |
| 2009/0240381 | A1 | 9/2009 | Lane |
| 2010/0106575 | A1 | 4/2010 | Bixby et al. |
| 2010/0191862 | A1 | 7/2010 | Forbes, Jr. et al. |
| 2010/0235008 | A1 | 9/2010 | Forbes, Jr. |
| 2011/0022239 | A1 | 1/2011 | Forbes, Jr. |
| 2011/0029655 | A1 | 2/2011 | Forbes, Jr. |
| 2011/0125422 | A1 | 5/2011 | Goncalves Jota et al. |
| 2011/0231320 | A1 | 9/2011 | Irving |
| 2011/0251807 | A1 | 10/2011 | Rada et al. |

FOREIGN PATENT DOCUMENTS

| | | |
|---|---|---|
| JP | 2000078748 | 3/2000 |
| JP | 2001306839 | 11/2001 |
| JP | 2004180412 | 6/2004 |
| JP | 2006060911 | 3/2006 |
| KR | 2005001584 | 1/2005 |
| WO | WO 2008125696 | 10/2008 |
| WO | WO 2009032161 | 3/2009 |
| WO | WO 2009032162 | 3/2009 |
| WO | WO 2010129059 | 11/2010 |
| WO | WO 2010129958 | 11/2010 |
| WO | WO 2010132456 | 11/2010 |
| WO | WO 2010132469 | 11/2010 |
| WO | WO 2010132477 | 11/2010 |
| WO | WO 2010134987 | 11/2010 |
| WO | WO 2011043818 | 4/2011 |
| WO | WO 2011046589 | 4/2011 |

OTHER PUBLICATIONS

Paul Darbee, INSTEON The Details, Smarthouse, Inc., Aug. 11, 2005, 68 pages.

Paul Darbee, INSTEON Compared, SmartLabs, Inc., Jan. 2, 2006, 69 pages.

Allowing for Household Preferences in Emission Trading, A Contribution to the Climate Policy Debate, Michael Ahlheim and Friedrich Schneider, Environmental and Resource Economics 21: 317-342, 2002 Kluwer Academic Publishers, Printed in the Netherlands (26 pages).

Environmental and economic benefits resulting from citizens' participation in $CO_2$ emissions trading: An efficient alternative solution to the voluntary compensation of $CO_2$ emissions, Olivier Rousse, Energy Policy 36 (2008) 388-397 (10 pages).

B.J. Kirby, Spinning Reserve from Responsive Loads, Oak Ridge National Laboratory, United States Dept. of Energy, Mar. 2003 (54 pages).

Eric Hirst and Brendan Kirby, Opportunities for Demand Participation in New England Contingency-Reserve Markets, New England Demand Response Initiative, Feb. 2003 (15 pages).

Pablo A. Ruiz and Peter W. Sauer, Valuation of Reserve Services, IEEE Proceedings of the $41_{st}$ Hawaii International Conference on System Sciences, 2008 (9 pages).

Eric Hirst and Richard Cowart, Demand Side Resources and Reliability, New England Demand Response Initiative, Mar. 20, 2002 (32 pages).

C.W. Gellings and W.M. Smith, Integrating Demand-Side Management into Utility Planning, Proceedings of the IEEE, vol. 77, Issue: 6, Jun. 1989, pp. 908-918 (Abstract only).

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

PCT/US2010/034409, "International Search Report".

PCT/US2010/034409, "Written Opinion of the International Searching Authority".

* cited by examiner

SYSTEM AND METHOD FOR SELECTIVE DISCONNECTION OF ELECTRICAL SERVICE TO END CUSTOMERS

CROSS-REFERENCE TO RELATED APPLICATIONS

This application is a continuation-in-part of U.S. patent application Ser. No. 11/895,909, filed on Aug. 28, 2007. This application claims the benefit of provisional patent application Ser. No. 61/177,004, filed on May 11, 2009, and provisional patent application 61/150,978 filed on Feb. 9, 2009. The specification and drawings of the provisional patent applications are specifically incorporated by reference herein. This application is also related to commonly-owned U.S. patent application Ser. No. 12/001,819, filed on Dec. 13, 2007.

BACKGROUND OF THE INVENTION

1. Field of the Invention

The present invention relates generally to electric power supply and generation systems and, more particularly, to allowing a utility to carry out a "selective" disconnect of utility customers using a two-way reporting approach.

2. Description of Related Art

One important activity of a power utility is the disconnection of service to customers. A service disconnection typically results from either of the following situations: (1) a customer moves out of his residence/business and no longer wants service delivered to that service point, or (2) a customer payment delinquency resulting from a past failure of the customer to pay the utility bill. In the first situation, the customer provides the utility with an order to disconnect service. In the second situation, the order comes from the utility's accounting department due to failure to pay the utility bill.

In the past, service disconnection involved one or more trips by a utility worker to the service point to notify the occupants of an upcoming disconnect, followed by another subsequent trip to the service point to physically flip the switch to disconnect power to the service point. This is referred to as a "hard disconnect." Hard disconnects are not always easy to handle because of issues such as the following: (1) angry customers due to the prospect of service disconnection; (2) uncontrolled pets or other animals; (3) physical difficulties of getting access to the disconnect switch; (4) weather conditions; (5) time and cost associated with getting to the customer's premises, which could be located in a remote area.

To overcome many of the issues related to a hard disconnect, utilities began to make use of Advanced Metering Infrastructure (AMI) technology that allowed utilities to remotely perform disconnects without the physical presence of a lineman or technician. This is achieved by installing or integrating within the electric meters ("smart meters") a remote disconnect switch that is actuated through commands sent to the electric meters via various communications methods. These communications methods are generally two-way in order to acknowledge the switch's "state" of allowing electricity to flow or not. There is some additional cost associated with installation of this equipment. However, this avoided most or all of the disadvantages of a hard disconnect noted above.

Although installation of AMI technology equipment resolved many of the issues related to hard disconnects, it added other problems. For example, some customers were put into life-threatening situations because of remote hard disconnects. In some rare cases, customers died because of the lack of heat during winter or from unanticipated "restarts" when a bill was paid sufficiently to warrant a service restoration from the serving utility. A remote hard disconnect may also be life-threatening when a customer has an important medical device using electricity.

Situations such as these have resulted in regulations or legislation in many areas preventing or restricting remote hard disconnects due to "customer payment delinquency." Because of this, as well as the additional costs related to remote hard disconnects, few utilities are now making use of remote hard disconnects. The result is that utilities are often either continuing to perform hard disconnects on-site at the service point or are performing "soft disconnects." A soft disconnect does not actually cut power to the service point but merely reads the customer's meter on the last date of occupancy and stops billing the customer after that. Soft disconnects are primarily useful in "customer move" situations in areas with high customer turnover, such as apartment buildings or near college campuses. In those areas, there is typically a quick succession of one customer moving out and another customer moving in.

The advantage of a soft disconnect is that it avoids the cost of physically visiting the service point at least twice—once for a disconnect, and once for a reconnect. It also allows the new customer to be reconnected faster than waiting for a physical visit by a utility worker. However, an obvious problem with a soft disconnect is that power may still be consumed by the service point, resulting in an additional cost to the landlord, the utility, or some other party. For example, the previous customer may have left the HVAC system running. Switch controlled devices, such as water heaters, may be left running by a customer because there is no obvious disconnection feature available to the previous customer.

SUMMARY OF THE INVENTION

In the disclosed embodiments, a system and method are provided for utilizing two-way reporting devices and an active load director to effect selective disconnection of electrical service to power-consuming devices at customer service points. In one embodiment, a selective disconnect of electrical service is made for a customer having a bill delinquency by selectively reducing power to devices based on information stored in a customer profile. In another embodiment, a selective disconnect is used in situations of high customer turnover, cutting power to selected devices to reduce energy consumption during a temporary vacancy while avoiding a hard disconnect.

In one embodiment, a method is provided for selective disconnection of electrical service to a customer via commands transmitted on a communications network between a server in communication with an electric utility and a client device at a customer service point. A customer profile is generated including at least connection information for a plurality of controllable devices within the service point. A request is received from the electric utility to generate a selective disconnect event at the service point based on the customer profile. The selective disconnect event is communicated to the client device at the service point. The selective disconnect event is sent to at least one controllable device at the service point.

In one embodiment, a system is provided for selective disconnection of electrical service to a customer via commands transmitted on a communications network between a server in communication with an electric utility and a client device at a customer service point. The system includes a memory for storing a database containing a plurality of customer profiles, wherein each customer profile includes at least connection information for a plurality of controllable devices within the associated service point; and a processor, cooperative with the memory, configured for selective disconnection of electrical service to a customer at the service point by: receiving a request from the electric utility to generate a selective disconnect event at the associated service point; and communicating the selective disconnect event to the client device for sending to at least one controllable device at the associated service point.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

Before describing exemplary embodiments in detail, it should be observed that the embodiments described reside primarily in combinations of apparatus components and processing steps related to a system and method to allow a utility to carry out a "selective" disconnect of utility customers. Accordingly, the apparatus and method components have been represented where appropriate by conventional symbols in the drawings, showing only those specific details that are pertinent to understanding the embodiments disclosed so as not to obscure the disclosure with details that will be readily apparent to those of ordinary skill in the art having the benefit of the description provided herein.

The term "electric utility" as used herein refers to any entity that generates and distributes electrical power to its customers, that purchases power from a power-generating entity and distributes the purchased power to its customers, or that supplies electricity created by alternative energy sources, such as solar power, wind power or otherwise, to power generation or distribution entities through the Federal Energy Regulatory Commission (FERC) electrical grid or otherwise.

The embodiments described utilize concepts disclosed in commonly-owned published patent application US 2009/0062970, entitled "System and Method for Active Power Load Management" which is incorporated by reference in its entirety herein. The following paragraphs describe the Active Management Load System (ALMS), Active Load Director (ALD), and Active Load Client (ALC) in sufficient detail to assist the reader in the understanding of the embodiments described herein. More detailed description of the ALMS, ALD, and ALC can be found in US 2009/0062970.

Active Load Management System

Figure 1:
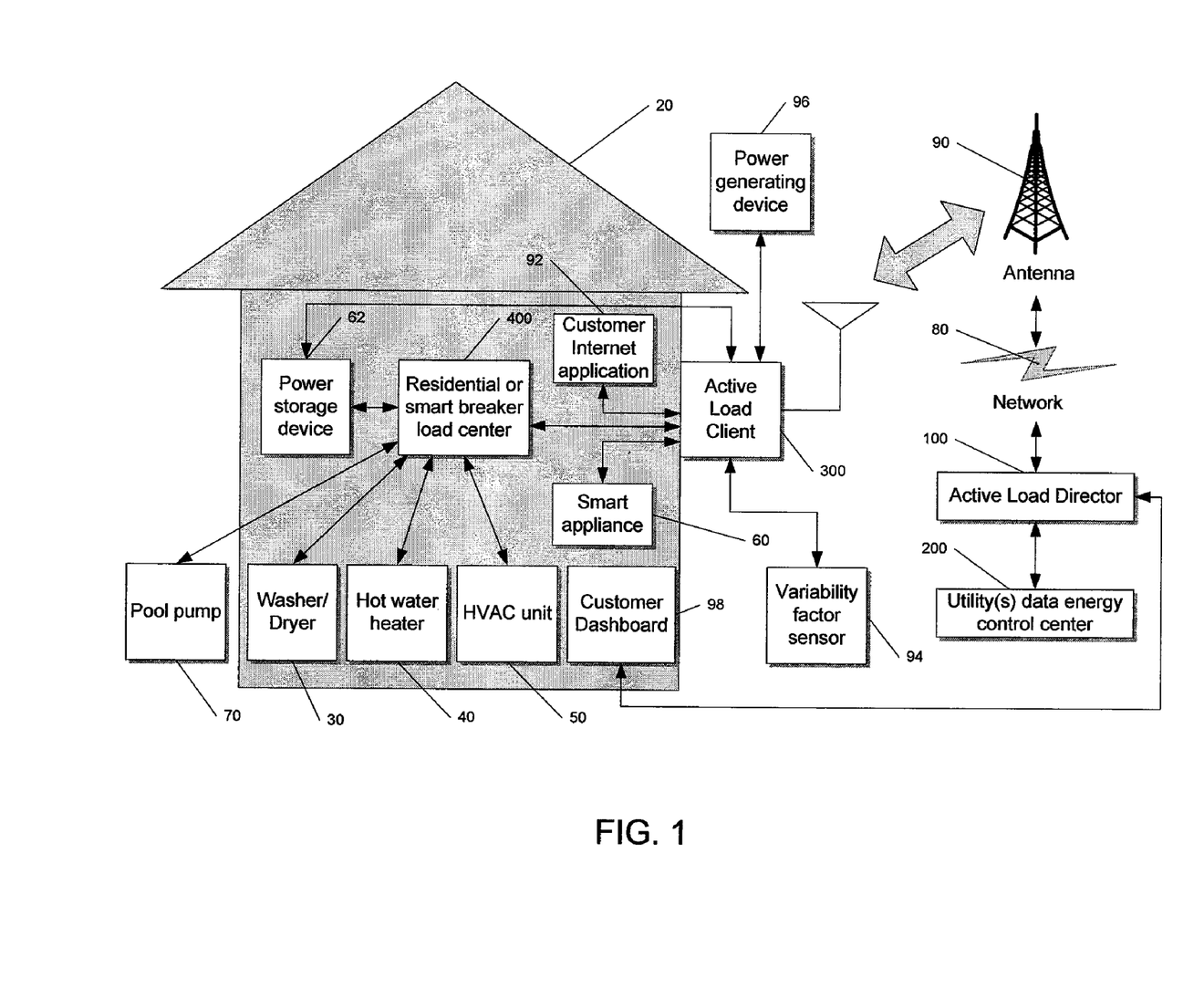
FIG. 1 is a block diagram of an exemplary IP-based, active power load management system.

FIG. 1 depicts an exemplary IP-based Active Load Management System (ALMS) 10 that may be utilized by a utility in the embodiments described herein. The exemplary ALMS 10 monitors and manages power distribution via an active load director (ALD) 100 connected between one or more utility control centers (UCCs) 200 and one or more Active Load Clients (ALCs) 300. The ALD 100 may communicate with the utility control center 200 and each active load client 300 either directly or through a network 80 using the Internet Protocol (IP) or any other connection-based protocols. For example, the ALD 100 may communicate using RF systems operating via one or more base stations 90 using one or more wireless communication protocols. Alternatively, or additionally, the ALD 100 may communicate via a digital subscriber line (DSL) capable connection, cable television based IP capable connection, or any combination thereof. In the exemplary embodiment shown in FIG. 1, the ALD 100 communicates with one or more active load clients 300 using a combination of traditional IP-based communication (e.g., over a trunked line) to a base station 90 and a wireless channel implementing the WiMax protocol for the "last mile" from the base station 90 to the active load client 300.

Each ALC 300 is accessible through a specified address (e.g., IP address) and controls and monitors the state of individual smart breaker modules or intelligent appliances 60 installed in the business or residence service point 20 to which the ALC 300 is associated (e.g., connected or supporting). Each ALC 300 is associated with a single residential or commercial customer. In one embodiment, the ALC 300 communicates with a residential load center 400 that contains smart breaker modules, which are able to switch from an "ON" (active) state to an "OFF" (inactive) state, and vice versa, responsive to signaling from the ALC 300. Typically, each smart breaker controls a single appliance (e.g., a washer/dryer 30, a hot water heater 40, an HVAC unit 50, or a pool pump 70).

Additionally, the ALC 300 may control individual smart appliances directly (e.g., without communicating with the residential load center 400) via one or more of a variety of known communication protocols (e.g., IP, Broadband over Power Line (BPL) in various forms, including through specifications promulgated or being developed by the HOME-PLUG Powerline Alliance and the Institute of Electrical and Electronics Engineers (IEEE), Ethernet, Bluetooth, ZigBee, Wi-Fi, WiMax, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

Also as shown in FIG. 1, a service point 20 may have its own power generation on-site, including solar panels, fuel cells, or wind turbines. This is indicated by the power generating device 96. The power generating device 96 connects to the Active Load Client 300. Power that is added by the power generating device 96 is added to the overall utility capacity. The utility provides credit to the service point owner based on the energy produced at the service point.

The service point 20 also contains the Customer Dashboard 98. This is a web-based interface used by the customer to specify preferences for the use of the Active Load Management System at the customer's service point. These preferences include control event preferences, bill management preferences, and others.

The Customer Dashboard 98 is also used to notify the customer of an upcoming disconnection or that service has already been disconnected. If the user wishes to reconnect, the utility may use the Customer Dashboard 98 to facilitate reconnection.

When a selective disconnect is requested, the utility control center 200 uses the ALD 100 to send appropriate control events to the ALC 300. These control events reflect the utility's policy for a selective disconnect, which may include, but is not limited to, the following policies: (1) contact the customer before a hard disconnect to allow the customer to take action before the disconnect; (2) turn off selected switch-controlled devices; (3) lower or raise the temperature for selected climate-controlled devices to the point of discomfort, but not life-threatening; (4) select a time of use that allows for continuity of service while protecting the utility's costs and the end customer's financial limitations.

The power generating device 96 is used to generate energy. Using the invention, the utility may want to selectively keep the power generating device 96 turned on even if other devices are turned off during a selective disconnect. This allows the utility to continue to make use of the device to generate power.

Active Load Director

Figure 2:
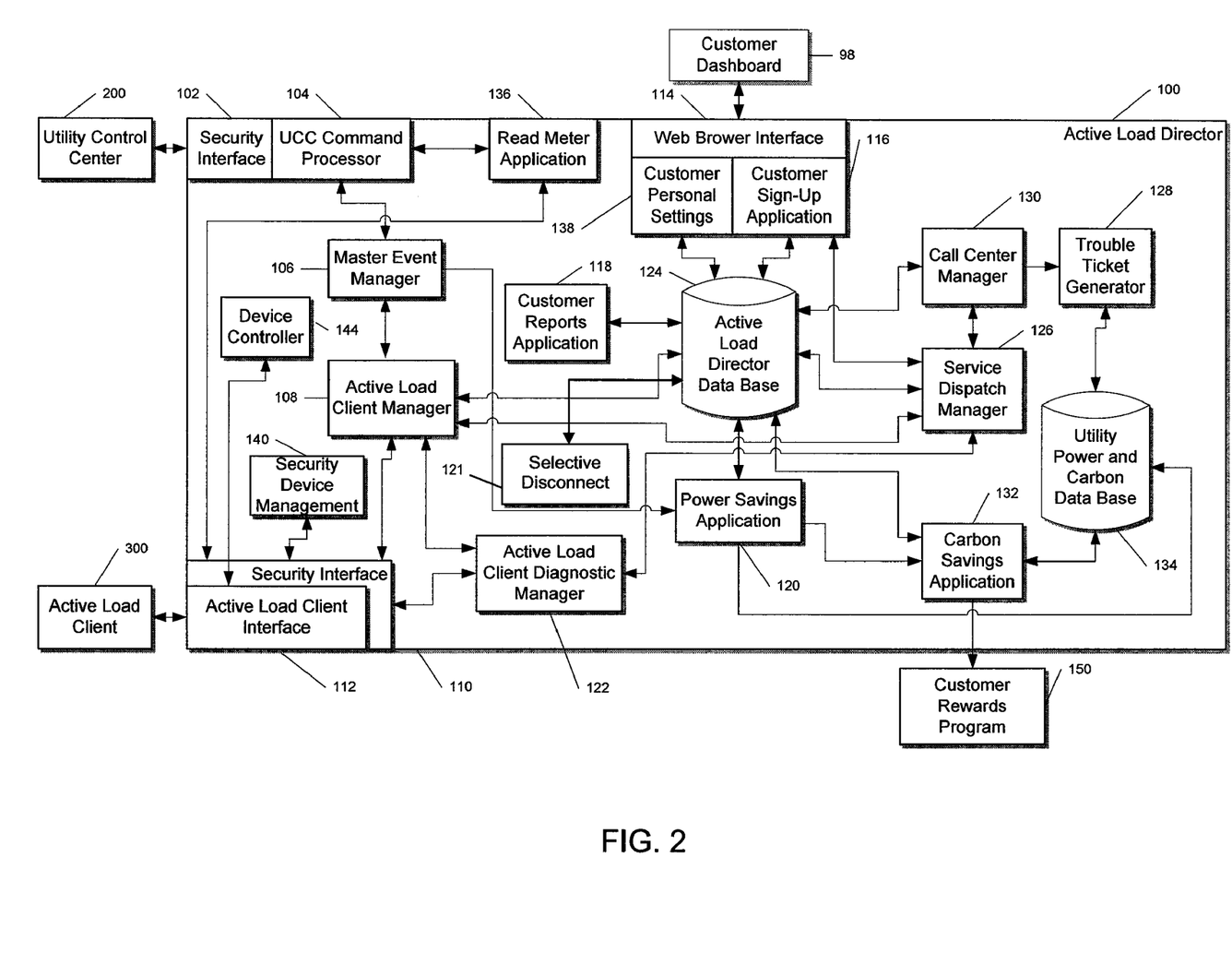
FIG. 2 is a block diagram illustrating an exemplary Active Load Director (ALD) included in the power load management system.

Referring now to FIG. 2, the ALD 100 may serve as the primary interface to customers, as well as to service personnel. In the exemplary embodiment depicted in FIG. 2, the ALD 100 includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, a selective disconnect application 121, an ALC diagnostic manager 122, an ALD database 124, a service dispatch manager 126, a trouble ticket generator 128, a call center manager 130, a carbon savings application 132, a utility power and carbon database 134, a read meter application 136, and a security device manager 140.

In one embodiment, customers interact with the ALD 100 using the web browser interface 114, and subscribe to some or all of the services offered by the power load management system 10 via a customer sign-up application 116. In accordance with the customer sign-up application 116, the customer specifies customer personal settings 138 that contain information relating to the customer and the customer's residence or business, and defines the extent of service to which the customer wishes to subscribe. Additional details of the customer sign-up application 116 are described below. Customers may also use the web browser interface 114 to access and modify information pertaining to their existing accounts.

The ALD 100 also includes a UCC security interface 102 which provides security and encryption between the ALD 100 and a utility company's control center 200 to ensure that no third party is able to provide unauthorized directions to the ALD 100. A UCC command processor 104 receives and sends messages between the ALD 100 and the utility control center 200. Similarly, an ALC security interface 110 provides security and encryption between the ALD 100 and each ALC 300 on the system 10, ensuring that no third parties can send directions to, or receive information from, the ALC 300. The security techniques employed by the ALC security interface 110 and the UCC security interface 102 may include conventional symmetric key or asymmetric key algorithms, or proprietary encryption techniques.

In one embodiment, the commands that can be received by the UCC command processor 104 from the electric utility's control center 200 include a "Cut" command, a "How Much" command, an "End Event" command, and a "Read Meters" command. The "Cut" command instructs the ALD 100 to reduce a specified amount of power for a specified amount of time. The specified amount of power may be an instantaneous amount of power or an average amount of power consumed per unit of time. The "Cut" command may also optionally indicate general geographic areas or specific locations for power load reduction. The "How Much" command requests information for the amount of power (e.g., in megawatts) that can be reduced by the requesting utility control center 200. The "End Event" command stops the present ALD 100 transaction. The "Read Meters" command instructs the ALD 100 to read the meters for all customers serviced by the requesting utility.

The UCC command processor 104 may send a response to a "How Much" command or an "Event Ended" status confirmation to a utility control center 200. A response to a "How Much" command returns an amount of power that can be cut. An "Event Ended" acknowledgement message confirms that the current ALD transaction has ended.

The master event manager 106 maintains the overall status of the power load activities controlled by the power management system 10. The master event manager 106 maintains a separate state for each utility that is controlled (when multiple utilities are controlled) and tracks the current power usage within each utility. The master event manager 106 also tracks the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD 100 and each ALC 300 within the system 10 through an ALC interface 112. For instance, the ALC manager 108 tracks the state of every ALC 300 serviced by specified utilities by communicating with the ALC 300 through an individual IP address. The ALC interface 112 translates instructions (e.g., transactions) received from the ALC manager 108 into the proper message structure understood by the targeted ALC 300 and then sends the message to the ALC 300. Likewise, when the ALC interface 112 receives messages from an ALC 300, it translates the message into a form understood by the ALC manager 108 and routes the translated message to the ALC manager 108.

The ALC manager 108 receives from each ALC 300 that it services, either periodically or responsive to polling messages sent by the ALC manager 108, messages containing the present power consumption and the status (e.g., "ON" or "OFF") of each device controlled by the ALC 300. Alternatively, if individual device metering is not available, then the total power consumption and load management status for the entire ALC 300 may be reported. The information contained in each status message is stored in the ALD database 124 in a record associated with the specified ALC 300. The ALD database 124 contains all the information necessary to manage every customer account and power distribution. In one embodiment, the ALD database 124 contains customer contact information, such as names, addresses, phone numbers, email addresses, and associated utility companies for all customers having ALCs 300 installed at their residences or businesses, as well as a description of specific operating instructions for each managed device (e.g., IP-addressable smart breaker or appliance), device status, and device diagnostic history.

Another message that can be exchanged between an ALC 300 and the ALC manager 108 is a status response message. A status response message reports the type and status of each device controlled by the ALC 300 to the ALD 100. When a status response message is received from an ALC 300, the ALC manager 108 logs the information contained in the message in the ALD database 124.

In one embodiment, upon receiving instructions (e.g., a "Cut" instruction) from the master event manager 106 to reduce power consumption for a specified utility, the ALC manager 108 determines which ALCs 300 and/or individually controlled devices to switch to the "OFF" state based upon present power consumption data stored in the ALD database 124. The ALC manager 108 then sends a message to each selected ALC 300 containing instructions to turn off all or some of the devices under the ALC's control.

In another embodiment, a power savings application 120 may be optionally included to calculate the total amount of power saved by each utility during a power reduction event (referred to herein as a "Cut event"), as well as the amount of power saved for each customer whose ALC 300 reduced the amount of power delivered. The power savings application 120 accesses the data stored in the ALD database 124 for each customer serviced by a particular utility and stores the total cumulative power savings (e.g., in megawatts per hour) accumulated by each utility for each Cut event in which the utility participated as an entry in the utility Power and Carbon database 134.

A read meter application 136 may be optionally invoked when the UCC command processor 104 receives a "Read Meters" or equivalent command from the utility control center 200. The read meter application 136 cycles through the ALD database 124 and sends a read meter message or command to each ALC 300, or to the ALCs 300 specifically identified in the UCC's command, via the ALC manager 108. The information received by the ALC manager 108 from the ALC 300 is logged in the ALD database 124 for each customer. When all the ALC meter information has been received, the information is sent to the requesting utility control center 200 using a business to business (e.g., ebXML) or other desired protocol.

The ALD maintains a connection/disconnection profile as part of each customer's overall customer profile. The disconnection profile contains information about devices within the service point that may receive limited or no control events, information about other devices (such as health devices) that may adversely affect the customer in the event of a disconnect, priority of service, and other connect/disconnect information about the customer. This profile is used as a guide to determine how and when a hard or selective disconnect may be performed. In FIG. 2, the connection/disconnection profile is part of the customer profile in the ALD Database 124. It is used by the Selective Disconnect Application 121 to determine when and how to apply a selective disconnect. Furthermore, due to the power measuring capabilities of the ALMS, it is possible to record the ambient temperature decay in the house via the calculation of dynamic drift coefficients to record and catalogue those houses whose inefficiency might qualify for low interest loans or local, state, federal, or charitable grants such that the efficiency of such houses might be improved to reduce the economic risk to the utility and to allow a more continuous use of power during a billing cycle.

The selective disconnect event is communicated to the ALC 300 via the Master Event Manager 106, Active Load Client Manager 108, and Active Load Client Interface 112 to the ALC 300. In one embodiment, messages may be sent from the Selective Disconnect Application 120 to the Customer Dashboard 98 via the Web Browser Interface 114. These messages can inform the customer of the selective disconnect, encouraging some action on the part of the customer.

Active Load Client

Figure 3:
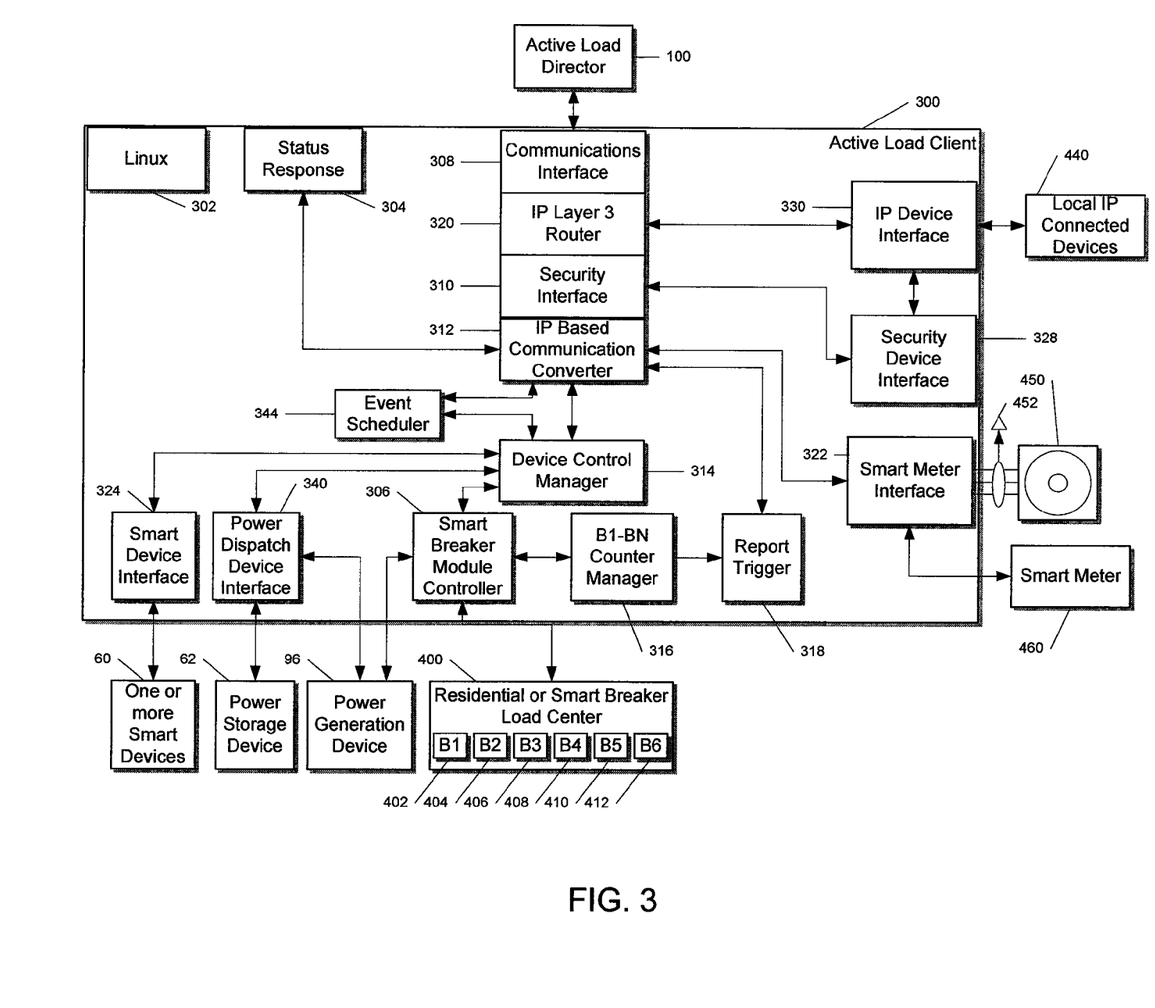
FIG. 3 is a block diagram illustrating an exemplary Active Load Client and smart breaker module included in the power load management system.

FIG. 3 illustrates a block diagram of an exemplary active load client 300 in accordance with one embodiment of the present invention. The depicted active load client 300 includes a smart breaker module controller 306, a communications interface 308, a security interface 310, an IP-based communication converter 312, a device control manager 314, a smart breaker (B1-BN) counter manager 316, an IP router 320, a smart meter interface 322, a smart device interface 324, an IP device interface 330, and a power dispatch device interface 340. The active load client 300, in this embodiment, is a computer or processor-based system located on-site at a customer's residence or business. The primary function of the active load client 300 is to manage the power load levels of controllable, power consuming load devices located at the residence or business, which the active load client 300 oversees on behalf of the customer. In an exemplary embodiment, the active load client 300 may include dynamic host configuration protocol (DHCP) client functionality to enable the active load client 300 to dynamically request IP addresses for itself and/or one or more controllable devices 402-412, 60 managed thereby from a DHCP server on the host IP network facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. Finally, the power generation device 96 at the service point 20 sends data about power generated to the power dispatch device interface 340.

A communications interface 308 facilitates connectivity between the active load client 300 and the ALD server 100. Communication between the active load client 300 and the ALD server 100 may be based on any type of IP or other connection protocol including, but not limited to, the WiMax protocol. Thus, the communications interface 308 may be a wired or wireless modem, a wireless access point, or other appropriate interface.

A standard IP Layer-3 router 320 routes messages received by the communications interface 308 to both the active load client 300 and to any other locally connected device 440. The router 320 determines if a received message is directed to the active load client 300 and, if so, passes the message to a security interface 310 to be decrypted. The security interface 310 provides protection for the contents of the messages exchanged between the ALD server 100 and the active load client 300. The message content is encrypted and decrypted by the security interface 310 using, for example, a symmetric encryption key composed of a combination of the IP address and GPS data for the active load client 300 or any other combination of known information. If the message is not directed to the active load client 300, then it is passed to the IP device interface 330 for delivery to one or more locally connected devices 440. For example, the IP router 320 may be programmed to route power load management system messages as well as conventional Internet messages. In such a case, the active load client 300 may function as a gateway for Internet service supplied to the residence or business instead of using separate Internet gateways or routers.

An IP based communication converter 312 opens incoming messages from the ALD server 100 and directs them to the appropriate function within the active load client 300. The converter 312 also receives messages from various active load client 300 functions (e.g., a device control manager 314, a status response generator 304, and a report trigger application 318), packages the messages in the form expected by the ALD server 100, and then passes them on to the security interface 310 for encryption.

The device control manager 314 processes power management commands for various controllable devices logically connected to the active load client 300. The devices can be either smart breakers 402-412 or other IP based devices 60, 460, such as smart appliances with individual control modules (not shown). The device control manager 314 also processes "Query Request" or equivalent commands or messages from the ALD server 100 by querying a status response generator 304 which maintains the type and status of each device controlled by the active load client 300, and providing the status of each device to the ALD server 100. The "Query Request" message may include information other than mere status requests, such as temperature set points for thermally controlled devices, time intervals during which load control is permitted or prohibited, dates during which load control is permitted or prohibited, and priorities of device control (e.g., during a power reduction event, hot water heater and pool pump are turned off before HVAC unit is turned off). If temperature set points or other non-status information are included in a "Query Request" message and there is a device 60 attached to the active load client 300 that can process the information, the temperature set points or other information are sent to that device 60 via a smart device interface 324.

The status response generator 304 receives status messages from the ALD server 100 and, responsive thereto, polls each controllable device 402-412, 60, 460 under the active load client's control to determine whether the controllable device 402-412, 60, 460 is active and in good operational order. Each controllable device 402-412, 60, 460 responds to the polls with operational information (e.g., activity status and/or error reports) in a status response message. The active load client 300 stores the status responses in a memory associated with the status response generator 304 for reference in connection with power reduction events.

The smart device interface 324 facilitates IP or other address-based communications to individual devices 60 (e.g., smart appliance power control modules) that are attached to the active load client 300. The connectivity can be through one of several different types of networks, including but not limited to, BPL, ZigBee, Wi-Fi, Bluetooth, or direct Ethernet communications. Thus, the smart device interface 324 is a modem adapted for use in or on the network connecting the smart devices 420 to the active load client 300. The smart device interface 324 also allows the device control manager 314 to manage those devices that have the capability to sense temperature settings and respond to temperature variations.

The smart breaker module controller 306 formats, sends, and receives messages to and from the smart breaker module 400. In one embodiment, the communications is preferably through a BPL connection. In such embodiment, the smart breaker module controller 306 includes a BPL modem and operations software. The smart breaker module 400 contains individual smart breakers 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power used by each smart breaker 402-412 and stores the counted amounts of power in a memory of the active load client 300 associated with the counter manager 316.

The smart meter interface 322 manages either smart meters 460 that communicate using BPL or a current sensor 452 connected to a traditional power meter 450. When the active load client 300 receives a "Read Meters" command or message from the ALD server 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD server 100.

Within the ALC 300 in FIG. 3, a selective disconnect event is sent to the Communications Interface 308 to the Device Interface 330, Smart Device Interface 324, Power Dispatch Device Interface 340, or Smart Breaker Module Controller 306 to the appropriate device (60, 62, 96, or 400). This event will typically either shut down or reduce power to the device.

Generally, the embodiments disclosed encompass a method and apparatus for performing a selective disconnect of a controllable, power-consuming device at the customer's service point. The embodiments disclosed allow the utility to selectively turn off power to some switch-controlled devices and to raise or lower the temperature of climate-controlled devices. The embodiments disclosed also allow the utility to selectively turn off devices at the service point to reduce unnecessary power consumption while the service point is not occupied.

One of the benefits of the Active Load Management System in a customer payment delinquency is that, with a reporting and controllable thermostat and with a device controller installed on a typical hot water heater, a utility can control the load consumed by selectively disconnecting power-consuming devices at the service point. In practice, the selective disconnect method involves installing a "selective" disconnect profile that would either reduce or de-energize hot water, put a two-way reporting and controllable thermostat at a pre-determined "set point" (e.g., 84 degrees during summer), or cycle the duty cycle of the device controller to achieve some method of reducing electrical usage while not totally disconnecting the end user's power. A secondary benefit is that the selective disconnect method would reduce the need for hard disconnects.

In one embodiment, the selective disconnect method can be used to limit energy consumption for those using energy credits. Energy credits are often made available to customers who have financial limitations and are unable to pay for increased energy usage during times such as very cold or hot time periods. The selective disconnect method can be used to selectively restrict electricity usage by devices for economically challenged customers. For example, in the telecommunications industry, a prepaid subscription for services allows a customer to consume the number of minutes of use and/or ancillary services such as texting until the usage exceeds the payment. In embodiments of the selective disconnect method, the customer selects which devices he is willing to pay for using energy credits. The electric utility allows the customer to decide which devices may be paid for using credits. This represents an opportunity previously unavailable to electric utilities to allow a customer to create custom "buckets" of electricity usage per device, referred to herein as bucket plans. The utility may also further constrain electricity usage in such bucket plans. For example, hot water may be available for mornings or evenings only, instead of not at all. Furthermore, cooling may be available for the hottest part of the day, or heating for the coolest part of the evenings, and a reduced temperature for other times.

In one embodiment, customers using bucket plans are constrained by time of use pricing such that the Active Load Management System (ALMS) may be programmed by the serving utility, and with the customer's consent, to consume more electricity when it is "off peak" for the utility, and restrict heavily the usage during peak times such that a continuity of service is maintained without interruption, and the accumulated usage is always known to the customer and the utility through two-way communicating thermostats, home displays, web-based user interfaces or customer service phone support. Thus, the selective disconnect method utilizes technology to reduce bad debts of the serving utilities while providing options, through the ALMS, for those customers with financial limitations.

Figure 4:
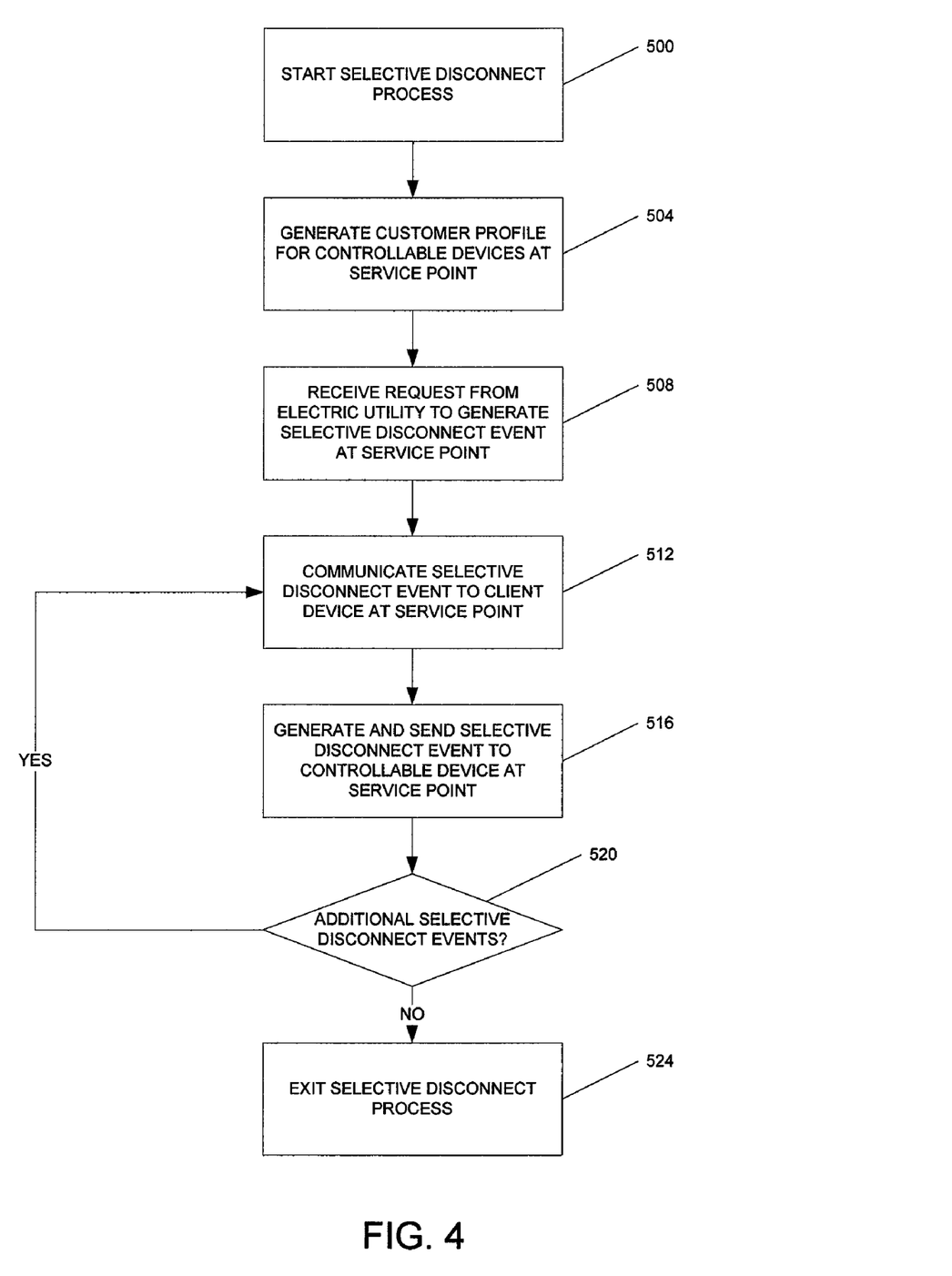
FIG. 4 is a flowchart illustrating the processing logic for performing a selective disconnect of electrical load in an exemplary embodiment.

FIG. 4 is a flowchart illustrating the processing logic for performing a selective disconnect of electrical load in an exemplary embodiment. The selective disconnect processing logic starts in block 500. Customer profiles are generated for controllable devices at a plurality of service points as indicated in block 504. An electric utility sends a request to the Active Load Director server over a network communications link to generate a selective disconnect event at a customer service point, as indicated in block 508. The request may include disconnect commands for multiple controllable power-consuming devices at the service point. The Active Load Director server communicates the selective disconnect event to the Active Load Client at the effected service point as indicated in block 512. The selective disconnect event is generated and sent to at least one controllable device at the service point, as indicated in block 516. A determination is made in decision block 520 if there are additional controllable devices at the service point that are to receive a disconnect command. If there are additional controllable devices that are to receive disconnect commands, the process returns to block 512. Otherwise, the selective disconnect process is exited in block 524.

It should be noted that many terms and acronyms are used in this description that are well-defined in the telecommunications and computer networking industries and are well understood by persons skilled in these arts. Complete descriptions of these terms and acronyms, whether defining a telecommunications standard or protocol, can be found in readily available telecommunications standards and literature and are not described in any detail herein.

As used in the foregoing description, the term "ZigBee" refers to any wireless communication protocol adopted by the Institute of Electrical and Electronics Engineers (IEEE) according to standard 802.15.4 or any successor standard(s), and the term "Bluetooth" refers to any short-range communication protocol implementing IEEE standard 802.15.1 or any successor standard(s). The term "Service Point Network" or "SPN" is meant to represent any technology that allows wireless or wired devices to communicate over short distances within or around a service point, using power line communications, Ethernet, ultra wideband (UWB), or IEEE 802.15.4 technology (such as Zigbee, 6LoWPAN, or Z-Wave technology). Power line communications includes any system communicating data using power lines. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol based on 3GPP Release 8 (from the ITU) or another mobile telecommunications standards body referring to the evolution of GSM-based networks to voice, video and data standards anticipated to be replacement protocols for HSPA and EVDO. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments or components of the systems described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein.

Furthermore, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

In the foregoing specification, the invention has been described with reference to specific embodiments. The embodiments encompass a system and method to allow a utility to carry out a selective disconnect of controllable, power-consuming devices at service points for utility customers who have not paid their bill. However, one of ordinary skill in the art will appreciate that various modifications and changes may be made without departing from the scope of the present invention as set forth in the appended claims. For example, disconnect events may be sent by equivalent non-IP means. Accordingly, the specification and drawings are to be regarded in an illustrative rather than a restrictive sense, and all such modifications are intended to be included within the scope of the present invention.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed:

1. A method for selective disconnection of electrical service to a customer via commands transmitted on a communications network between a server in communication with an electric utility and a client device at a customer service point, comprising the steps of:
   generating a customer profile including at least connection information for a plurality of controllable devices within the service point and association of the connection information of each controllable device with the customer;
   receiving a request from the electric utility to generate a selective disconnect event at the service point based on the customer profile;
   communicating the selective disconnect event to the client device at the service point; and
   generating and sending the selective disconnect event to at least one of the controllable devices at the service point.

2. The method for selective disconnection of claim 1 wherein the selective disconnect event communicated to the client device based on the customer profile comprises a command to reduce power to, or remove power from, the at least one of the controllable devices at the service point.

3. The method for selective disconnection of claim 1 wherein the customer profile connection information comprises at least one of information about controllable devices within the service point that can receive a control event, information about controllable devices that may adversely affect the customer in a disconnect event, and a priority of service for the customer.

4. The method for selective disconnection of claim 1 further comprising sending a control event to the service point to remove power to at least one of the plurality of controllable devices selectively.

5. The method for selective disconnection of claim 4 wherein at least one of the plurality of controllable devices is switch controlled.

6. The method for selective disconnection of claim 1 wherein at least one of the plurality of controllable devices provides two way reporting to the client device.

7. The method for selective disconnection of claim 1 wherein the plurality of controllable devices comprises at least one climate-controlled device.

8. The method for selective disconnection of claim 7 wherein the at least one climate-controlled device comprises at least one of a thermostat, a water heater, a heating, ventilation, and air conditioning (HVAC) system, and a pool pump.

9. The method for selective disconnection of claim 7 further comprising sending a control event to at least one climate-controlled device to raise or lower a temperature setting to a predetermined set point, and holding the setting of the at least one climate-controlled device at the predetermined set point.

10. The method for selective disconnection of claim 1 further comprising communicating the selective disconnect event from a master event manager operable with the server in communication with the electric utility to a device control manager application operable with the client device.

11. The method for selective disconnection of claim 1 further comprising communicating the selective disconnect event from a selective disconnect application operable on the server in communication with the electric utility to a customer dashboard application operable with the client device via a web browser application.

12. The method for selective disconnection of claim 1 further comprising enabling the customer to obtain energy credits and to select the power-consuming device to which the energy credits are applied.

13. The method for selective disconnection of claim 12 further comprising enabling the customer to create a bucket plan of energy use for the selected power-consuming device wherein the bucket plan is constrained by the utility based on at least one criterion.

14. The method for selective disconnection of claim 13 wherein the at least one bucket plan constraint criterion includes at least one of a time of day use, a peak hours use, and an off-peak hours use.

15. The method for selective disconnection of claim 12 further comprising receiving an accumulated energy credit usage data from the electric utility via the server in communication with the electric utility.

16. A system for selective disconnection of electrical service to a customer via commands transmitted on a communications network between a server in communication with an electric utility and a client device at a customer service point, comprising:
   a memory storing a database containing a plurality of customer profiles wherein each customer profile includes at least connection information for a plurality of controllable devices within the associated service point and association of the connection information of each controllable device with the customer; and
   a processor, cooperative with the memory, and configured for selective disconnection of electrical service to a customer at the service point by:
      receiving a request from the electric utility to generate a selective disconnect event at the associated service point based on the customer profile; and
      communicating the selective disconnect event to the client device for sending to at least one of the controllable devices device at the associated service point.

17. The system for selective disconnection of claim 16 wherein the processor is further configured for sending a command to the client device based on the customer profile contained in the database to reduce power to, or remove power from, the at least one of the controllable devices at the service point.

18. The system for selective disconnection of claim 16 wherein the customer profile contained in the database comprises at least one of information about controllable devices within the service point that can receive a control event, information about controllable devices that may adversely affect the customer in a disconnect event, and a priority of service for the customer.

19. The system for selective disconnection of claim 16 wherein the processor is further configured for sending a control event to the service point to remove power to at least one of the plurality of controllable devices selectively.

20. The system for selective disconnection of claim 16 wherein at least one of the plurality of controllable devices is switch controlled.

21. The system for selective disconnection of claim 16 wherein at least one of the plurality of controllable devices provides two way reporting to the client device.

22. The system for selective disconnection of claim 16 wherein the plurality of controllable devices comprises at least one climate-controlled device.

23. The system for selective disconnection of claim 22 wherein the at least one climate-controlled device comprises at least one of a thermostat, a water heater, a heating, ventilation, and air conditioning (HVAC) system, and a pool pump.

24. The system for selective disconnection of claim 22 wherein the processor is further configured for sending a control event to at least one climate-controlled device to raise or lower a temperature setting to a predetermined set point, and holding the setting of the at least one climate-controlled device at the predetermined set point.

25. The system for selective disconnection of claim 16 wherein the processor is further configured for communicating the selective disconnect event from a master event manager operable with the server in communication with the electric utility to a device control manager application operable with the client device.

26. The system for selective disconnection of claim 16 wherein the processor is further configured for communicating the selective disconnect event from a selective disconnect application operable on the server in communication with the electric utility to a customer dashboard application operable with the client device via a web browser application.

27. The system for selective disconnection of claim 26 wherein the processor is further configured for enabling the customer to select the power-consuming device to which an energy credit is applied.

28. The system for selective disconnection of claim 27 wherein the processor is further configured for enabling the customer to create a bucket plan of energy use for the selected power-consuming device wherein the bucket plan is constrained by the utility based on at least one criterion.

29. The system for selective disconnection of claim 28 wherein the at least one bucket plan constraint criterion includes at least one of a time of day use, a peak hours use, and an off-peak hours use.

30. The system for selective disconnection of claim 27 wherein the processor is further configured for receiving an accumulated energy credit usage data from the electric utility via the server in communication with the electric utility.

* * * * *

UNITED STATES PATENT AND TRADEMARK OFFICE
CERTIFICATE OF CORRECTION

| | | |
|---|---|---|
| PATENT NO. | : 8,260,470 B2 | Page 1 of 1 |
| APPLICATION NO. | : 12/702768 | |
| DATED | : September 4, 2012 | |
| INVENTOR(S) | : Joseph W. Forbes, Jr. et al. | |

It is certified that error appears in the above-identified patent and that said Letters Patent is hereby corrected as shown below:

Title page, Item (60) Related U.S. Application Data section, please amend the section to read:
Provisional application No. 61/177,044, filed on May 11, 2009, provisional application No. 61/150,978, filed on Feb. 9, 2009, <u>and is also related to commonly-owned U.S. patent application Ser. No. 12/011,819, filed on Dec. 13, 2007</u>.

In the Claims

In Claim 16, column 14, line 44, please delete the second occurrence of "device."
Line 44 should read: "label devices ~~device~~ at the associated service point."

Signed and Sealed this
Sixteenth Day of April, 2013

Teresa Stanek Rea
*Acting Director of the United States Patent and Trademark Office*